United States Patent
Schow

Patent Number: 5,295,410
Date of Patent: Mar. 22, 1994

[54] USE OF BORING HEADS AS ADJUSTABLE THROW ECCENTRIC SHAFTS

[76] Inventor: Duane Schow, 11531 Hidden Valley Blvd., Sandy, Utah 84092

[21] Appl. No.: 934,191

[22] Filed: Aug. 24, 1992

[51] Int. Cl.⁵ .............................................. F16H 35/08
[52] U.S. Cl. .................................. 74/571 L; 74/571 R; 74/837
[58] Field of Search ................ 74/571 R, 571 L, 828, 74/831, 837; 29/401.1

[56] References Cited

U.S. PATENT DOCUMENTS

| | | | |
|---|---|---|---|
| 2,960,013 | 11/1960 | Novkov | 74/571 |
| 3,106,105 | 10/1963 | Booth | 74/571 |
| 3,375,730 | 4/1968 | Antonenko | 74/571 |
| 3,436,988 | 4/1969 | Simonton | 74/837 |
| 3,470,823 | 10/1969 | Seeger | 103/38 |
| 3,798,996 | 3/1974 | Kirschmann | 74/571 M |
| 4,235,130 | 11/1980 | Dulger et al. | 74/831 |
| 4,261,228 | 4/1981 | Eagan, Sr. | 74/837 X |
| 4,326,314 | 4/1982 | Moret et al. | 74/837 X |
| 4,398,854 | 8/1983 | Pape et al. | 408/185 |
| 4,538,336 | 9/1985 | Oliver | 29/426.6 |
| 5,012,710 | 5/1991 | D'Andrea et al. | 82/1.2 |

*Primary Examiner*—Leslie A. Braun
*Assistant Examiner*—Ryan W. Massey

[57] ABSTRACT

The use of boring heads, normally used to machine accurate sized holes, as adjustable throw eccentric shafts. Boring head shanks are removed and replaced with bearing supported shafts, or otherwise attached to a rotatable energy source. Bearings are mounted to the boring head slides either directly, or by means of an adapter, or bearing journal. By selecting a suitable boring head, the adjustment may be made when the machine is at rest, or when running, manually or automatically. By fitting stepper motors or servo motors to boring heads which are manually adjustable while running, the adjustment may be controlled by a numerical control or computer control. When modified accordingly, boring heads are suitable adjustable eccentrics or crank shafts, and can be incorporated into various machine designs, providing an economical, readily available, and very accurate machine member.

12 Claims, 11 Drawing Sheets

USE OF BORING HEADS AS ADJUSTABLE THROW ECCENTRIC SHAFTS

BACKGROUND OF THE INVENTION

1. Field of the Invention

The present invention relates to adjustable throw crank shafts and eccentric shafts as a means for varying the stroke of an interconnected components of mechanisms.

Many mechanical devices rely on crank shafts or eccentric shafts, hereafter referred to as eccentrics, interconnected to various types of motion mechanisms to transform rotary motion to reciprocating motion or reciprocating motion to rotary motion. An example of the first type of transformation is a typical gasoline engine wherein the reciprocating motion is linear, the power being transmitted from the piston through the connecting rod to cause the eccentric to rotate. An example of the second type of transformation, also in a linear device, is an air compressor. In this case the power is transmitted from the eccentric through a connecting rod to the piston. A washing machine is an example of a device which could use the mechanism to transform rotary motion to reciprocating angular motion.

On occasion there is a need to adjust the throw of the eccentric of such a mechanism, in order to change the magnitude of reciprocation. The vast majority of eccentrics have fixed throws, and therefore will not meet this need. Many devices have been suggested to provide adjustable throw eccentrics. Kirschmann (3,798,996) teaches an outer crank sleeve mounted on two spaced apart eccentric collar assemblies. By rotating the collar assemblies the eccentric is adjusted. This device is somewhat complicated and therefore expensive to produce in small quantities. It requires the mechanism to be stopped during the adjustment, and is difficult to adjust accurately. Oliver (4,538,336) teaches a simpler device which would be somewhat less expensive to produce than Kirschmann's device, but also requires the device to be stopped during adjustment, and is even more difficult to adjust accurately. Antonenko (3,375,730) and Seeger (3,470,823) teach devices similar to Oliver's, and has the same limitations. Dulger (4,235,130) teaches the use of cam shaped grooves in the eccentric. The connecting rod attaches to these grooves. Adjustment is by means of actuating a worm gear assembly. While the device can be adjusted while running, it still has the problems of relatively expensive production, and difficulty in accurate adjustments. Simonton (3,436,988) teaches a device similar to those of Oliver and Seeger, but with the addition of a jack screw attached to a gearing mechanism to provide adjustability while running. While it meets the requirement of adjustability during running, it is also difficult to adjust accurately, and would be relatively expensive to produce in small quantities. Eagan (4,261,228) teaches a device in which a spherical journal is mounted to a pivoted bracket. The adjustment is made by means of a mechanism comprised of a hand knob and shaft, a threaded gear, thrust bearings, and a fork. The device can be adjusted while running, however the adjustment is difficult to make accurately, and because of its complicated design, would be relatively expensive to produce in small quantities. Booth (3,106,105) teaches an adjustable eccentric wherein the adjustment is provided by the axial movement of a canted slide. This device can also be adjusted while running, however, because of its complicated design, it would also be relatively expensive to produce in small quantities. Moret et al (4,326,314) teaches a canted journal which can be moved axially in relation to the bearing, thereby adjusting the stroke. This design is specifically applied to a powered tooth brush, which would be manufactured in large quantities. This design would also be relatively expensive to produce in small quantities.

SUMMARY OF THE INVENTION

It is an objective of this invention to provide the economies of scale to applications of adjustable throw eccentrics, both those adjustable only while stopped and those adjustable while running.

This can be accomplished by using devices designed for use in machine shops for boring holes in workpieces, generally referred to as boring heads. Although some of these devices are complicated, they are produced in quantity, and are available off the shelf thereby providing the economies of scale.

It is further an objective of this invention to provide a means of adjusting the throw of the eccentric while running, by utilizing boring heads which are designed for adjustment while running, for those applications which have this requirement. This provides for accurate adjustment as well.

It is a further object of this invention to provide automatic adjustment of the throw of the eccentric, while running, by utilizing boring heads which have this capability where this requirement is needed.

It is a further object of this invention to provide numerically controlled or computer controlled adjustment of the throw of the eccentric while running by modifying boring heads designed for adjustment while running with the addition of numerically controlled or computer controlled motors.

DETAILED DESCRIPTION OF THE PREFERRED EMBODIMENTS OF THE INVENTION

A group of devices, which are used for a very different purpose in machine shops, can be used as very accurately adjustable eccentrics. These devices, generally called boring heads, are used to bore out holes to very accurate dimensions. Various configurations are available, from units which must be adjusted while at rest, such as U.S. Pat. No. 4,398,854 assigned to Kaiser Precision Tooling, Inc. to units which can be adjusted while rotating, such as U.S. Pat. No. 5,012,710 invented by D'Andrea et al. Boring bars which include cutting edges are mounted to these boring heads for the boring of holes. These units typically have very accurate means of locating the boring bars parallel to the centers of rotation of the boring heads.

Since most boring operations are intended for producing accurate cylindrical holes, many of the boring heads are only adjustable when stopped. The size of the bored hole is determined by the setting of the cutting edge of the boring bar a distance from the axis of rotation of the boring head equal to the radius of the hole desired. A typical boring head, of this type, has a slidable member which can move in a direction perpendicular to the axis of rotation of the boring head. This slide of this type of boring head is often positioned by means of a lead screw, thereby providing accurate adjustability of the radial position of the boring bar.

Some boring operations require the boring of concentric holes with a machined flat surface at the interface, require facing of the surface of the part at the entrance of the hole, or require the boring of conical holes. In order to meet these needs, some boring heads are designed so as to allow the radial position of the boring bar to be adjusted while the boring head is rotating, thereby providing a means of facing, changing hole diameters, or boring conical holes without stopping. Certain of this type of boring heads are fitted with hand cranks for use in making the adjustment. Some are equipped with mechanisms to automatically adjust the boring bar position while the boring head is running.

By fitting a bearing or bearing journal to a boring head in place of a boring bar, the boring head can be used as an adjustable throw eccentric. In as much as these boring heads are typically produced in quantity, the economies of scale can be realized in designs incorporating adjustable throw eccentrics even though single units, or low quantities are produced.

Figure 1A:
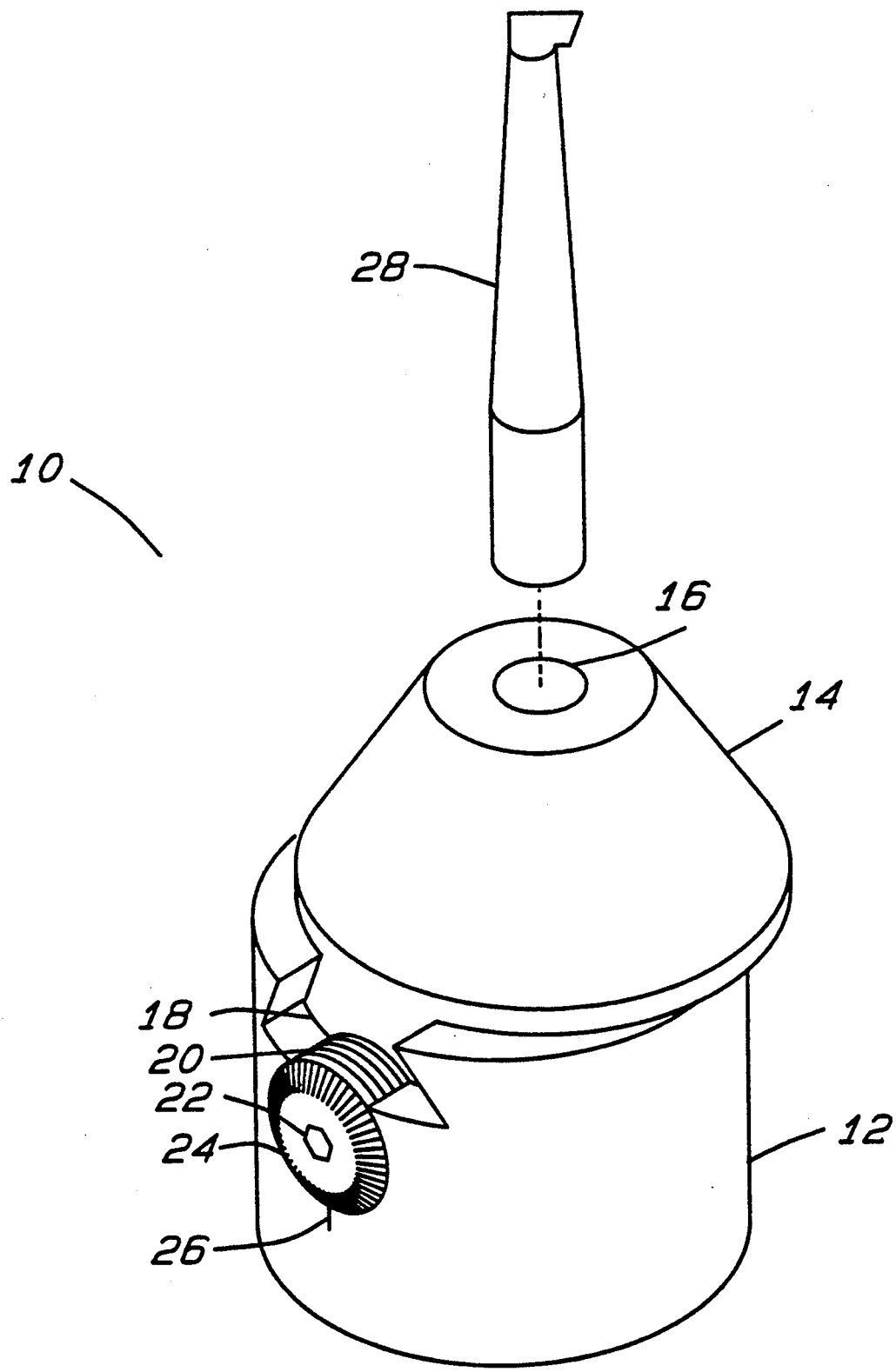
FIG. 1A is an isometric view of a simple boring head.

FIG. 1A shows a boring head 10, of relatively simple design. This type of boring head can be accurately adjusted to allow the boring of holes in workpieces to an accuracy of within 0.001 inches. They are manufactured by several manufacturers such as Criterion Machine Works, Costa Mesa, Calif.

Body 12 of boring head 10 is attachable to a variety of shanks or arbors (not shown) to fit in the spindles of machine tools. A slide 14 is slidably attached to body 12 by means of dovetail 18 or other slide means. An accurately machined hole 16 is located in slide 14 so as to be parallel to the axis of rotation of body 12. An adjusting screw 20 with graduations 24 on one end is fitted to slide 14 so as to allow it to turn without axial motion. Adjusting screw 20 engages internal threads (not shown) in body 12. By fitting a hexagonal wrench (not shown) into hexagonal hole 22 in adjusting screw 20 the screw may be turned providing controlled movement of slide 14 with respect to body 12. By observing the number of graduations 24 which pass witness mark 26, very accurate movements can be made. After the adjustment is made, a clamping device (not shown) locks slide 14 in place. Boring bar 28 is removably mounted in hole 16 for boring holes. By fitting body 12 with a suitable machine member (not shown) in place of the shank (not shown), boring head 10 can be incorporated into mechanical devices for use as an adjustable eccentric.

Figure 1B:
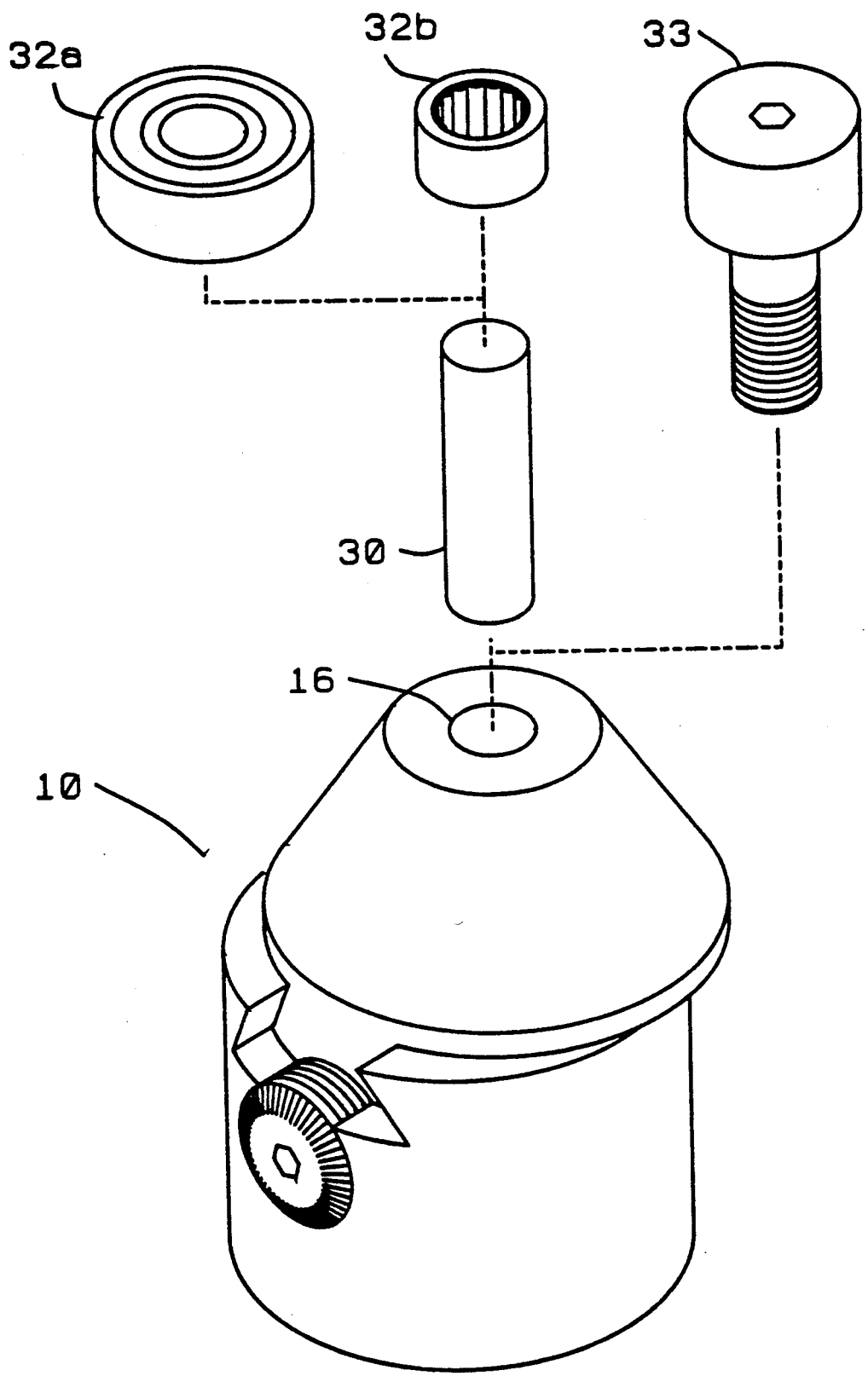
FIG. 1B is an isometric view of the boring head of FIG. 1A with a bearing mounted in place of the cutting tool.

FIG. 1B shows boring head 10 fitted with a bearing journal 30 in hole 16. With journal 30 and bearing 32A or 32B mounted in place of boring bar 28, boring head 10 can function as an eccentric. Alternatively cam follower bearing 33 can be mounted in hole 16 with similar results.

Figure 2A:
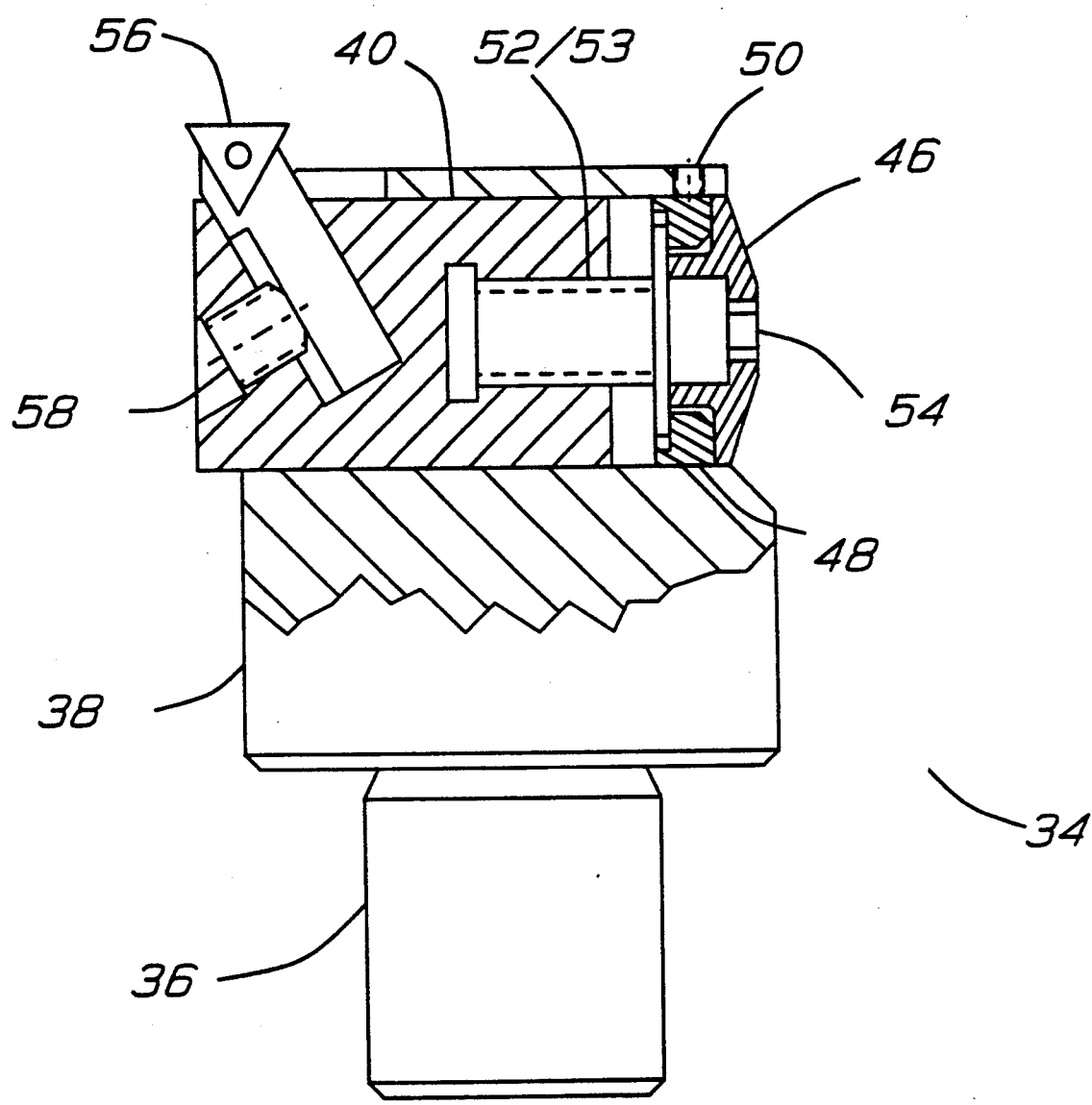
FIG. 2A is a partially sectioned front elevation of an alternate boring head.
Figure 3:
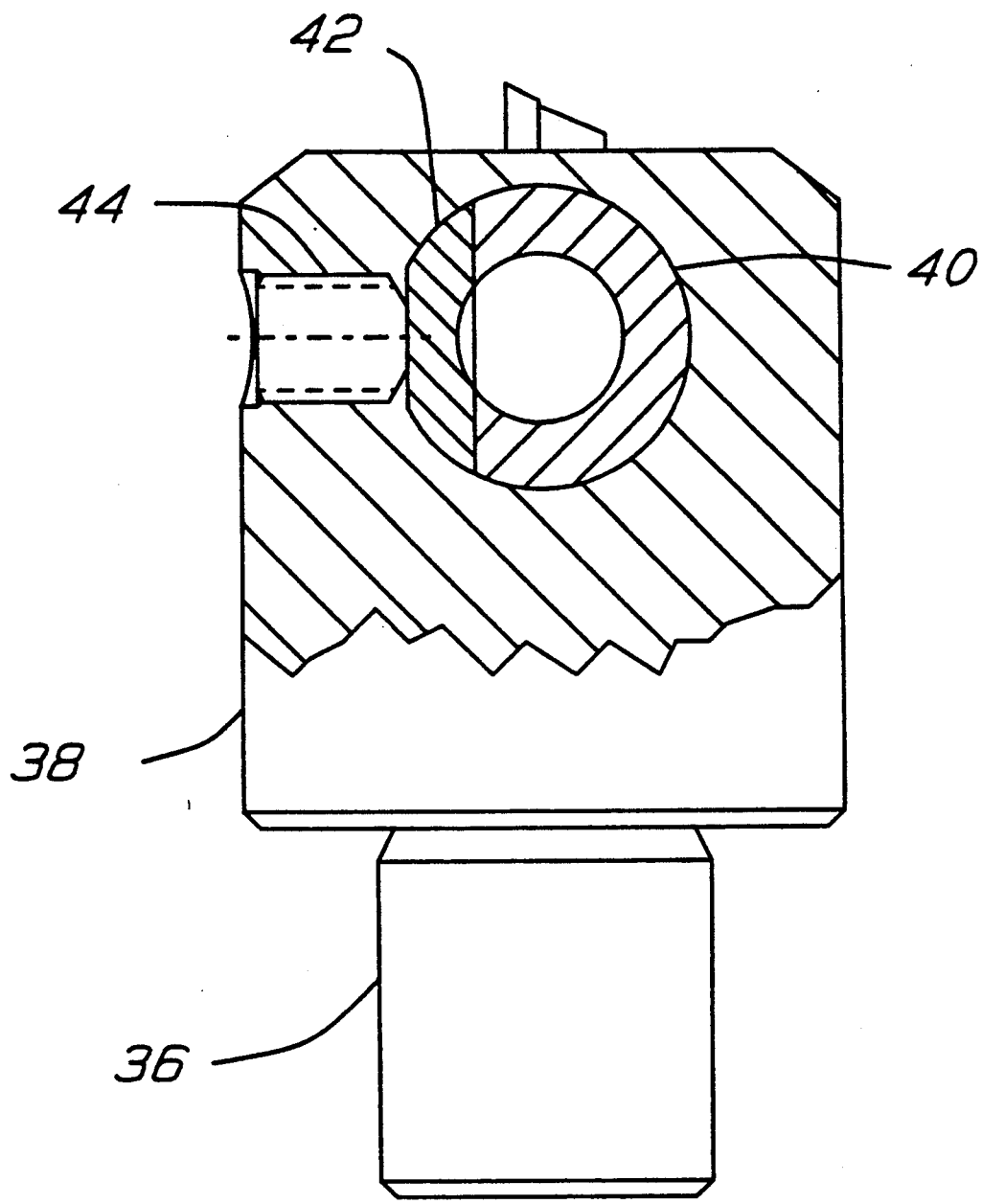
FIG. 3 is a partially sectioned side elevation of the boring head of FIG. 2A.

FIGS. 2A and 3 are section views of another type of boring head 34 available from KPT Kaiser Precision Tooling, Inc., Elk Grove, Ill. This boring head has a built in shank 36 which is normally fitted into various arbors (not shown) to adapt it to machine tool spindles. Tool carrier 40 is slidably mounted in body 38 so as to move perpendicularly to the axis of rotation of body 38. Clamping block 42 is clamped against tool carrier 40 by means of screw 44. Graduated dial 46 is fitted to body 38 by means of collar 48 and screw 50, so as to allow rotation without axial motion. Adjusting screw 52, which is fastened to dial 46, is connected to tool carrier 40 by means of female threads 53 in tool carrier 40. Adjusting screw 52 is turned by means of a hexagonal wrench (not shown) inserted into hexagonal hole 54. Tool carrier 40 is adjusted by turning adjusting screw 52. When the adjustment is completed, tool carrier 40 is clamped by means of clamping block 42 and screw 44. A boring tool 56 is positioned in tool carrier 40 and clamped in place by screw 58. By fitting shank 35 with a suitable machine member (not shown) in place of an arbor (not shown), boring head 34 can be incorporated into mechanical devices for use as an adjustable eccentric.

Figure 2B:
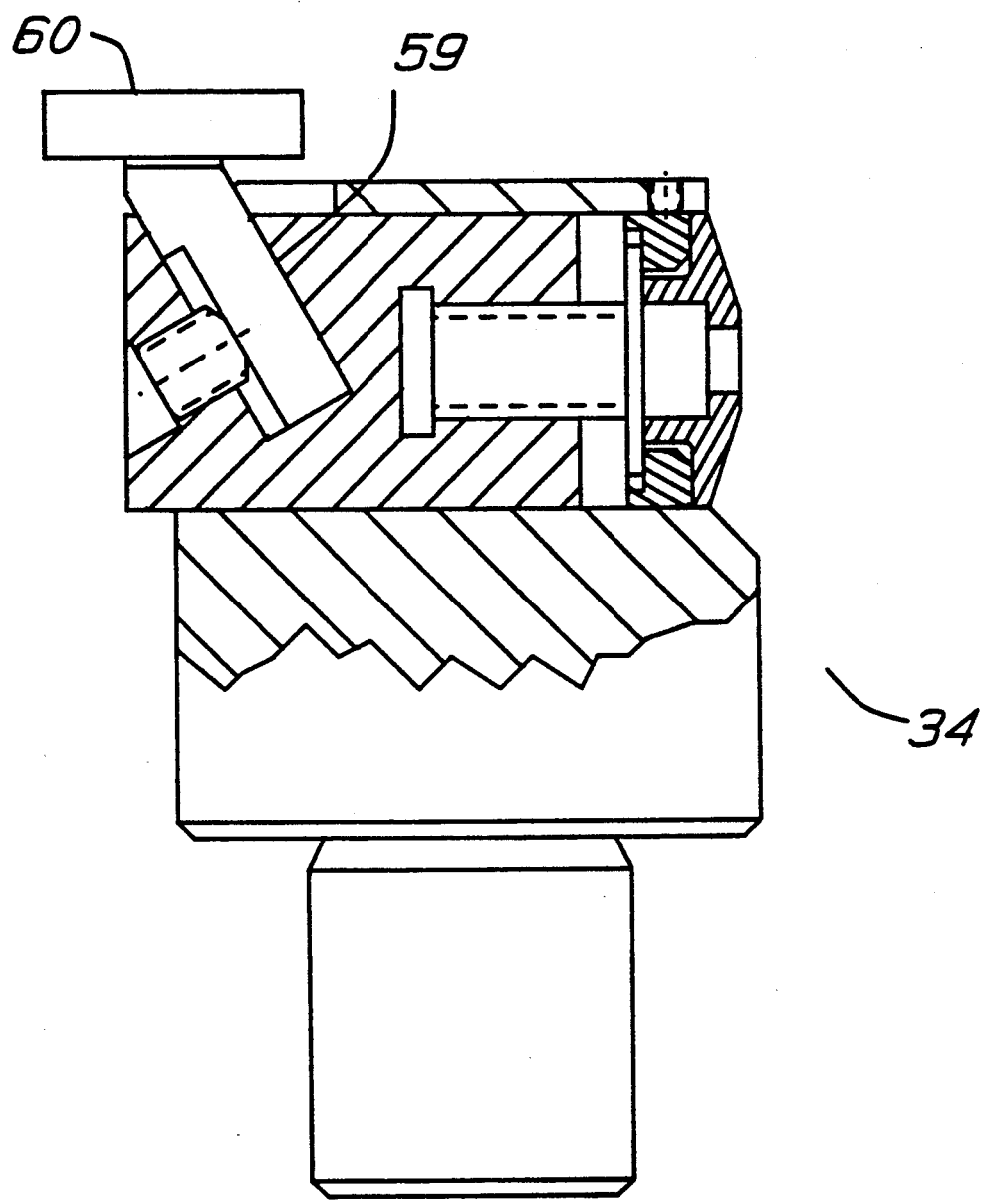
FIG. 2B is a partially sectioned front elevation of the boring head of FIG. 2A with a bearing mounted in place of the cutting tool.

FIG. 2B shows boring head 34 fitted with an adapter 59 in place of boring tool 56. Bearing 60 is mounted on adapter 59, allowing boring head 34 to function as an eccentric.

Figure 4A:
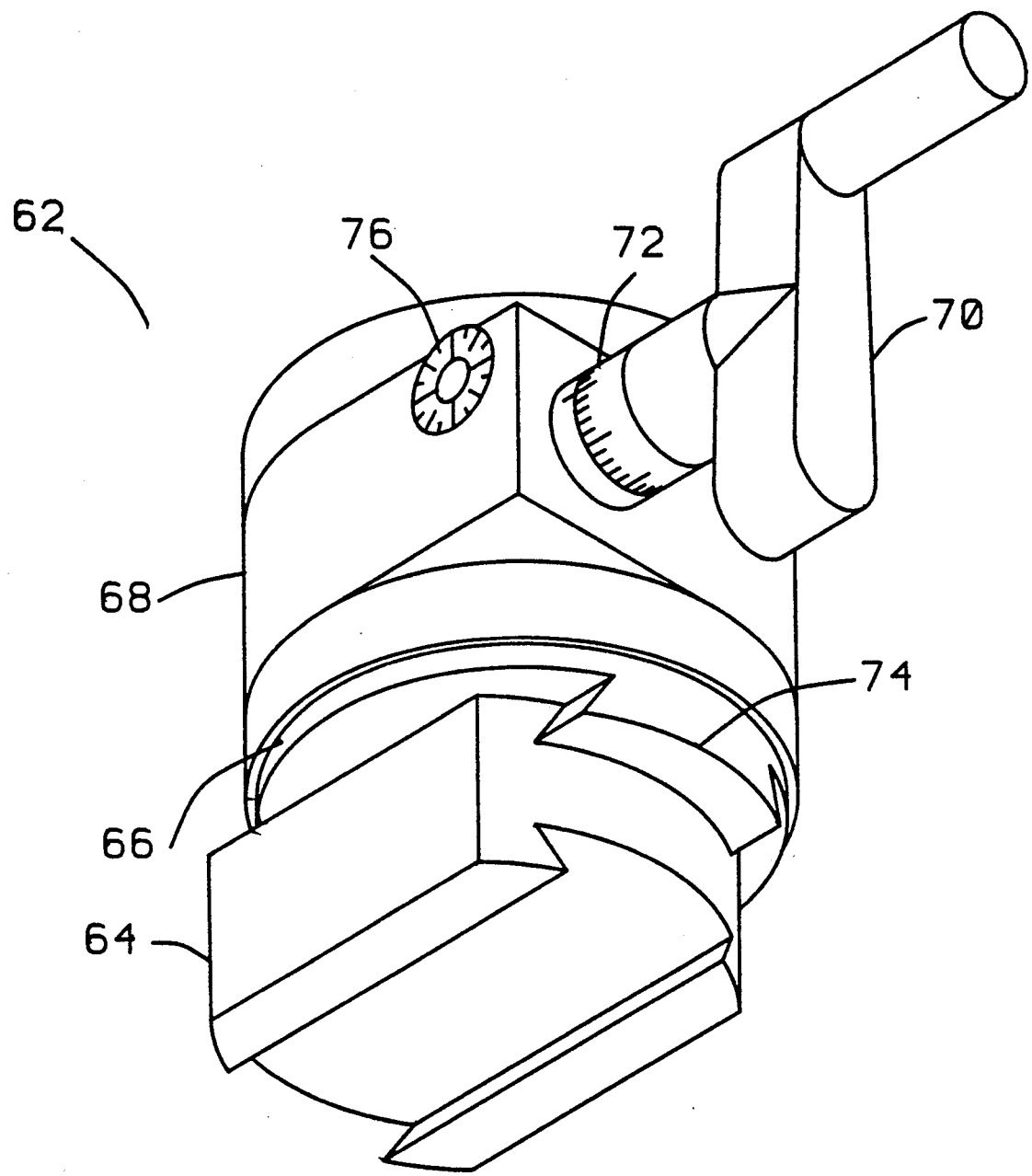
FIG. 4A is an isometric view of a boring head which is manually adjustable while rotating.

FIG. 4A is an isometric view of a boring head 62 in which the adjustment of slide 64 can be accomplished manually while boring head 62 is rotating. This boring head is available from the tool firm D'Andrea of Milano, Italy. Body 66 is surrounded by a cover 68 which remains stationary while the rest of boring head 62 rotates. Adjusting handle 70 with graduated sleeve 72 can be manually rotated to cause motion of slide 64 relative to body 66. Slide 64 is slidably attached to body 66 by means of dovetail 74. Graduated dial 76 indicates the number of rotations of handle 70 and graduated dial 72. By fitting body 66 with a suitable machine member (not shown) in place of a shank or arbor (not shown), boring head 62 can be incorporated into mechanical devices for use as an eccentric which is adjustable while running.

Figure 4B:
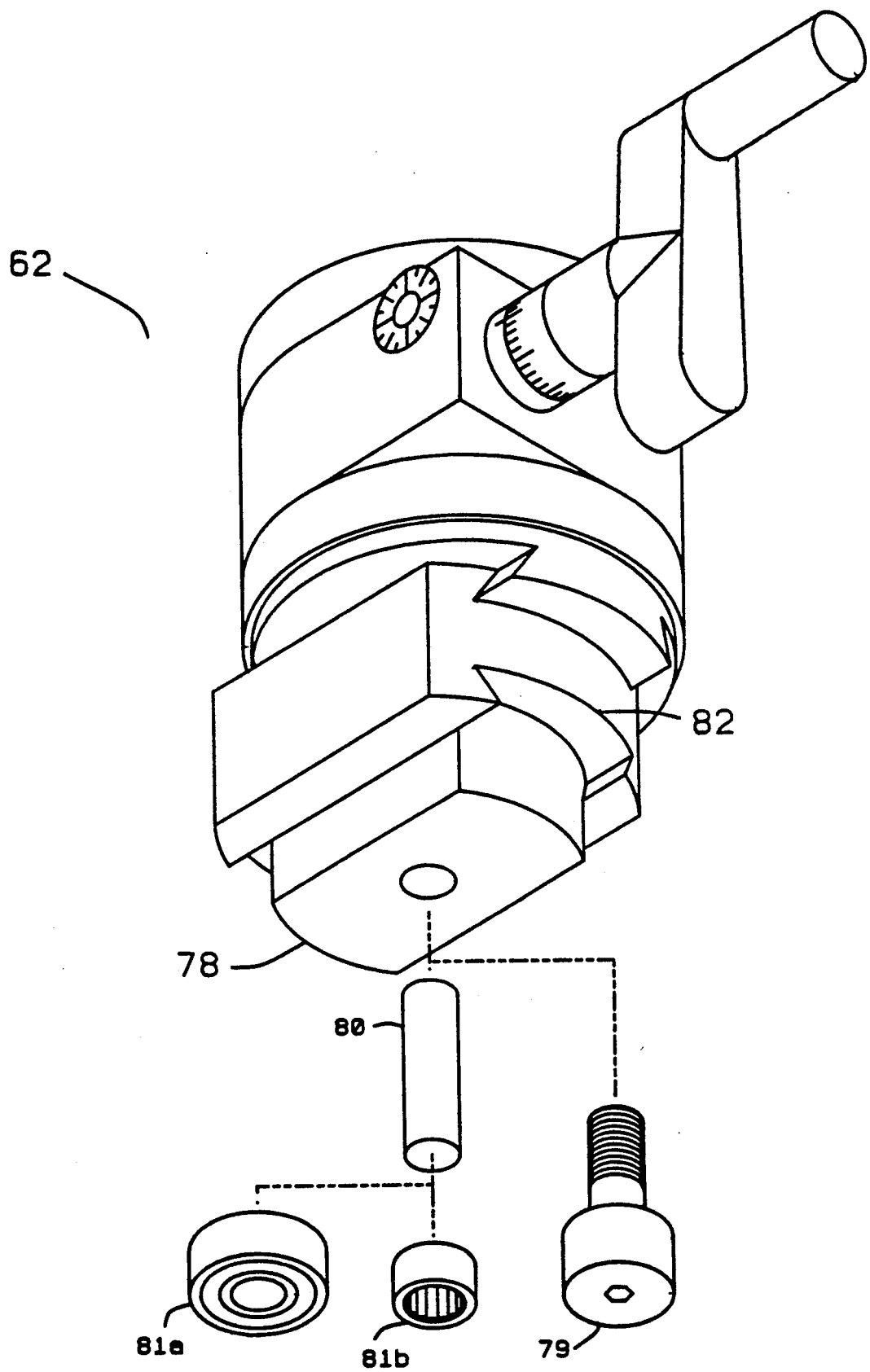
FIG. 4B is an isometric view of the boring head of FIG. 4A with a bearing mounted in place of the cutting tool.

FIG. 4B shows boring head 62 with an adapter 78 fitted to dovetail 82. Bearing 79 is to be mounted in adapter 78. Alternatively bearing journal 80 and either bearing 81A or 81B can be mounted to adapter 78. Thus modified, boring head 62 can function as an eccentric.

Figure 5A:
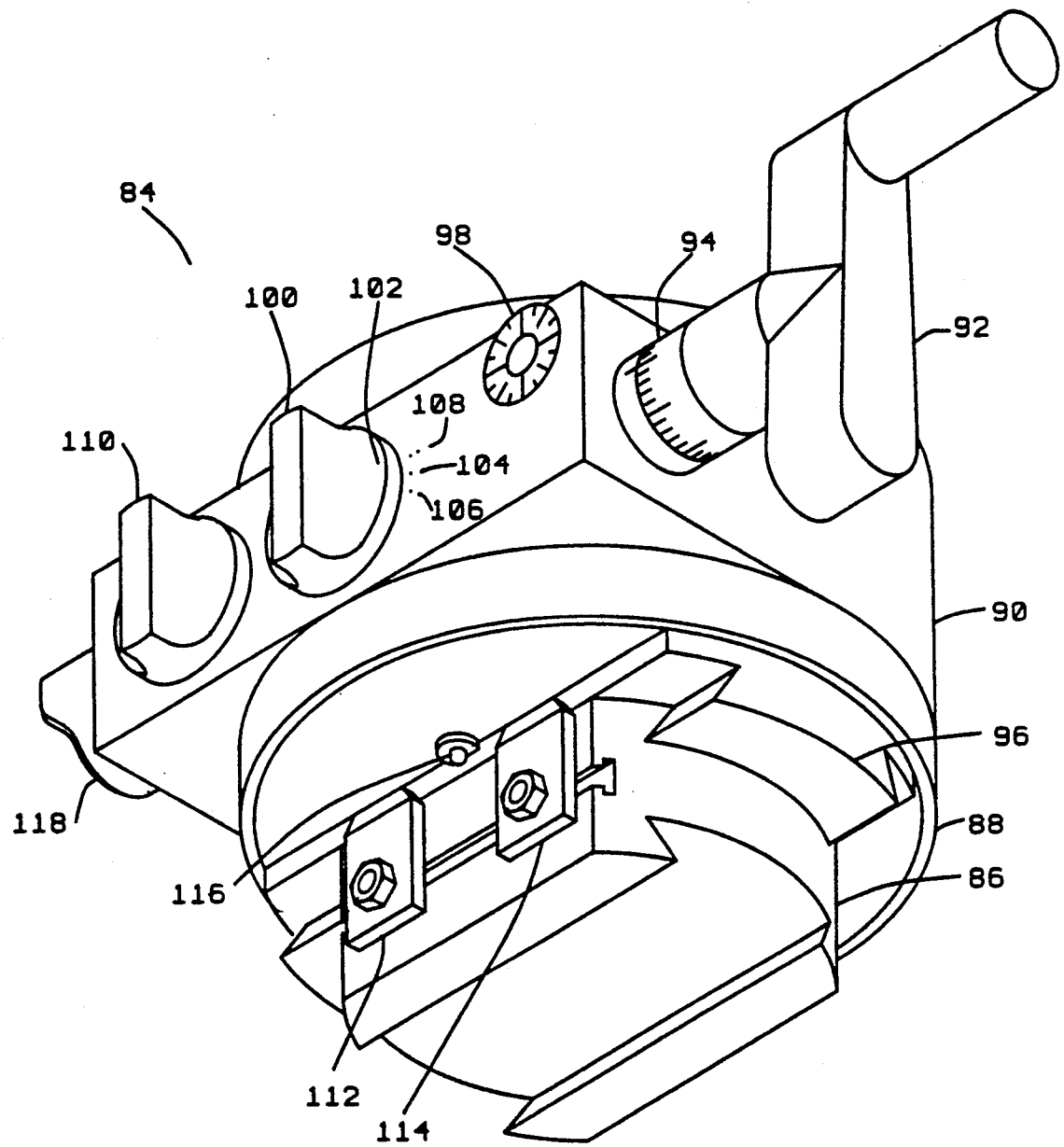
FIG. 5A is an isometric view of a boring head which is manually, and automatically adjustable while rotating.

FIG. 5A is an isometric view of a boring head 84 in which the adjustment of slide 86 can be accomplished manually or automatically while boring head 84 is rotating. This boring head is available from the tool firm D'Andrea of Milano, Italy. Body 88 is surrounded by a cover 90 which remains stationary while the rest of boring head 84 rotates. Adjusting handle 92 with graduated sleeve 94 can be manually rotated to cause motion of slide 86 relative to body 88. Slide 86 is slidably attached to body 88 by means of dovetail 96. Graduated dial 98 indicates the number of rotations of handle 92 and graduated dial 94. Knob 100 is used to select manual or automatic feed. When witness mark 102 is placed adjacent to mark 104 boring head 84 can be manually adjusted in the same manner as boring head 62 (FIG. 4A). When witness mark 102 is adjacent to mark 106 boring head 84 will adjust automatically at a low feed rate. When witness mark 102 is adjacent to mark 108 boring head 84 will adjust automatically at a high feed rate. Knob 110 is a feed lock for resetting graduated sleeve 94. When in the automatic mode, slide 86 with attached adjustable dogs 112 and 114 moves without manual rotation of handle 92. When dog 112 trips button 116, the automatic feed is disengaged. By turning knob 118, the slide will reposition rapidly until dog 114 trips button 116. By fitting body 88 with a suitable machine member (not shown) in place of a shank or arbor (not shown), boring head 84 can be incorporated into mechanical devices for use as an eccentric which is adjustable while running.

Figure 5B:
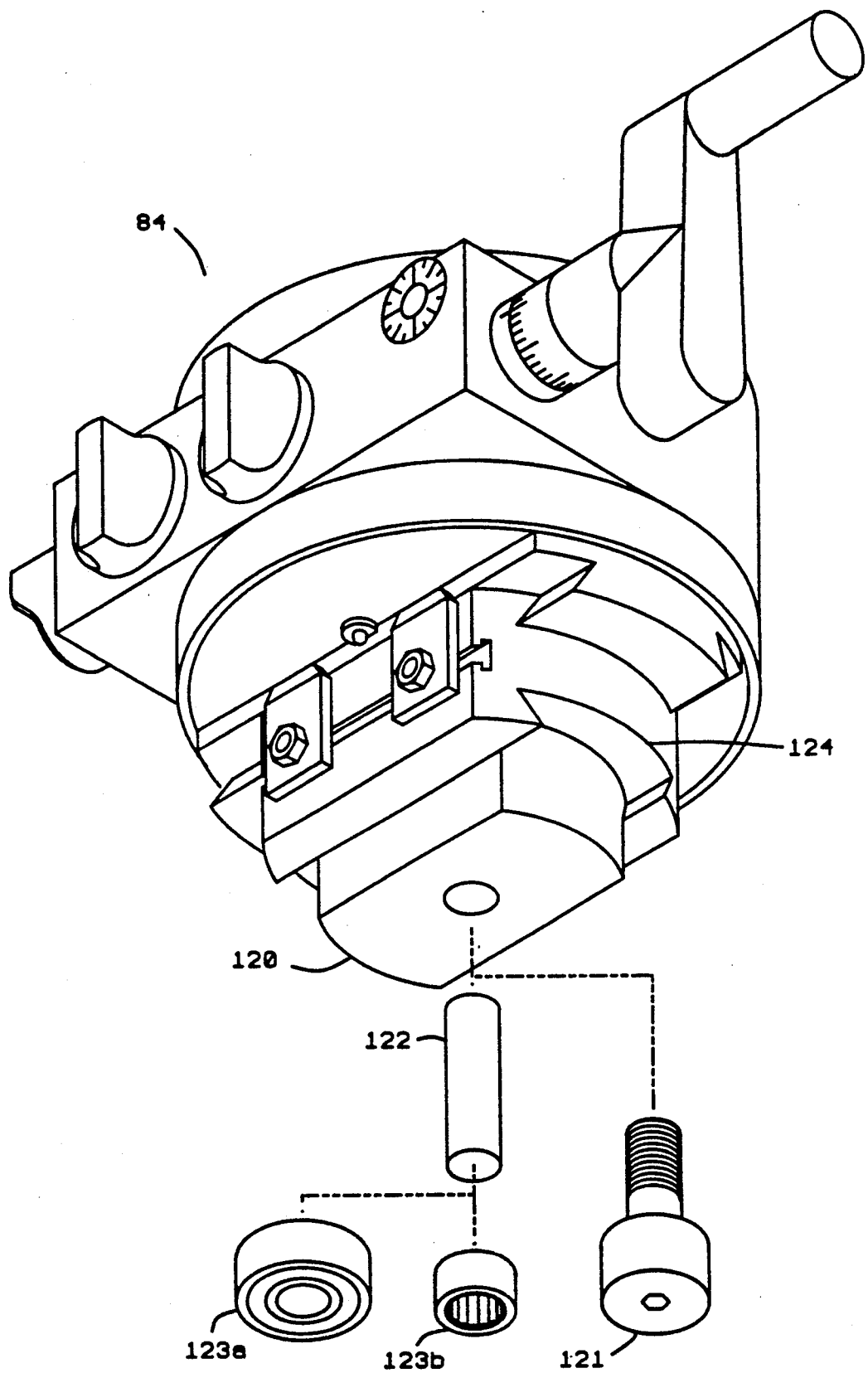
FIG. 5B is an isometric view of the boring head of FIG. 5A with a bearing mounted in place of the cutting tool.

FIG. 5B shows boring head 84 with an adapter 120 fitted to dovetail 124. Bearing 121 is to be mounted in adapter 120. Alternatively bearing jounral 122 and either bearing 123A or 123B can be mounted to adapter 120. Thus modified, boring head 84 can function as an eccentric.

Figure 6:
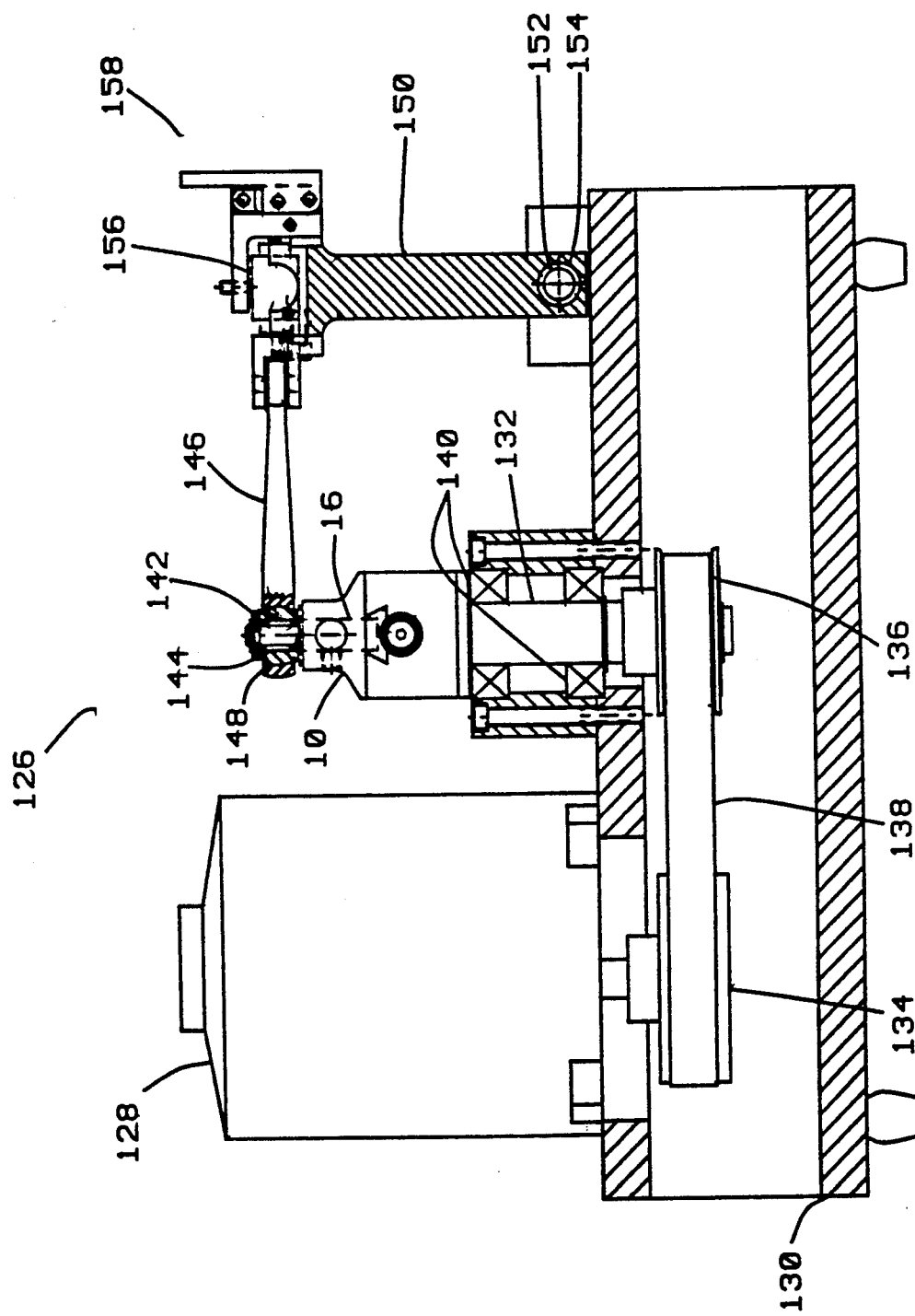
FIG. 6 is a sectioned side view of a machine utilizing a simple boring head as an adjustable eccentric.

FIG. 6 is a partial sectional view of a machine 126 which utilizes a boring head 10 of the type shown in FIGS. 1A and 1B. Motor 128 is mounted to base 130 and is connected to shaft 132 by means of pulleys 134 and 136 and belt 138. Boring head 10 is attached to shaft 132 which is mounted between bearings 140. Bearing journal 142 is mounted in mounting hole 16 of boring head 10. Needle bearing 144 is mounted to journal 142 and connecting rod 146 which includes spherical bearing 148. Connecting rod 146 connects to shaker arm 150 by means of another spherical bearing (not shown). Shaker arm 150 pivots on shaft 152 and needle bearing 154. Test specimen 156 is clamped in shaker arm 150 by means of clamp 158. The arc through which shaker arm 150 reciprocates is determined by the adjustable throw of boring head 10.

Figure 7:
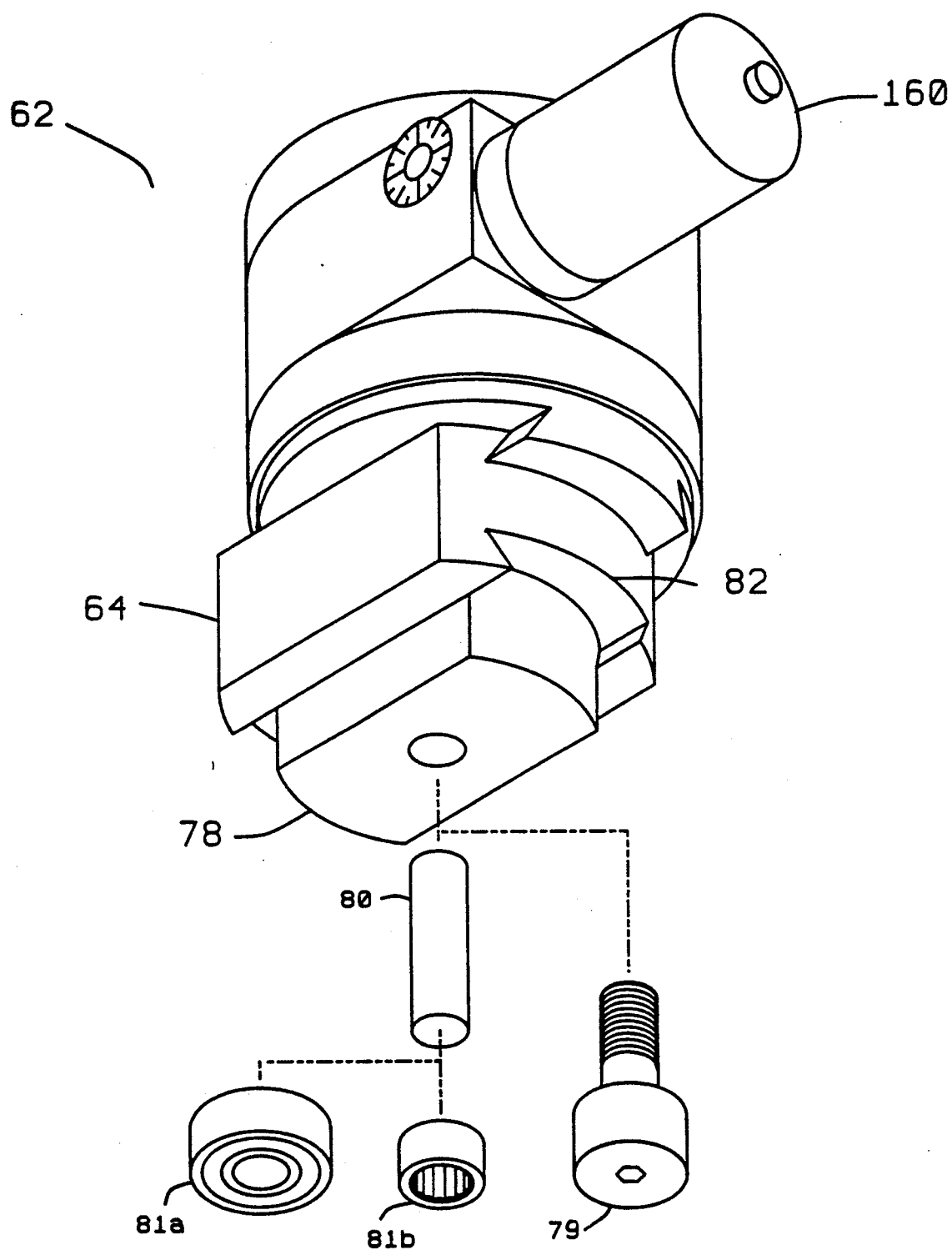
FIG. 7 is an isometric view of a boring head which has been modified with the addition of a numerically controlled or computer controlled motor.

FIG. 7 shows a boring head 62 wherein adjusting handle 70 and graduated sleeve 72 have been removed and replaced with a numerically controlled or computer controlled motor 160. It is well known in the art that the rotation of the shaft of such motors can be very accurately controlled numerically or by computer. By controlling motor 160 in this manner, the movement of slide 64 can be automatically programmably controlled while it is running.

Accordingly the reader will see that the use of boring heads as accurately adjustable eccentrics as described above is entirely plausible and reasonable.

The use of this invention provides economies of scale to applications of adjustable throw eccentrics where the quantities required are low.

This invention provides manual means of adjusting the throw of an eccentric while running, by utilizing boring heads designed for manual adjustment while running.

This invention provides automatic throw adjustment of the eccentric while running by utilizing boring heads with this feature designed into them.

This invention provides numerical control or computer control of the throw adjustment by replacing the manual control means of boring heads which, can be adjusted while running, with numerically controlled or computer controlled motors.

Although the description above contains many specificities, these should not be construed as limiting the scope of the invention, but as merely providing illustrations of some of the presently preferred embodiments of this invention. For example the placement of a needle bearing in the boring bar hole of the boring head, instead of the bearing journal, or any other method of attaching a bearing to the boring head or the connecting rod is within the scope of this invention. Another example would be the copying of any boring head in any scale for the purpose of incorporation in designs to provide adjustable eccentrics.

I claim:

1. An adjustable throw eccentric shaft comprising:
   (a) a boring head comprising a body, a slide, and means for moving said slide relative to said body;
   (b) a bearing means;
   (c) an attachment means for attaching said bearing means to said slide of said boring head;
   (d) an attachment means for attaching said boring head to a rotating member of a mechanical device.

2. The invention of claim 1 wherein a connecting means connects said bearing means to a reciprocating means, whereby the amount of reciprocation varies depending on the adjustment of the boring head.

3. The invention of claim 2 wherein said boring head comprises a manual means of adjusting the throw while said boring head is at rest.

4. The invention of claim 2 wherein said boring head comprises a manual means of adjusting the throw while said boring head is rotating.

5. The invention of claim 4 wherein said adjusting means is fitted with a numerically controlled or computer controlled rotary energy means in order to automate adjustment of said throw programmably.

6. The invention of claim 2 wherein said boring head comprises an automatic means of adjusting the throw while said boring head is rotating.

7. The invention of claim 6 wherein said adjusting means is fitted with a numerically controlled or computer controlled rotary energy means in order to automate adjustment of said throw programmably.

8. The invention of claim 1 wherein said boring head comprises a manual means of adjusting the throw while said boring head is at rest.

9. The invention of claim 1 wherein said boring head comprises a manual means of adjusting the throw while said boring head is rotating.

10. The invention of claim 9 wherein said adjusting means is fitted with a numerically controlled or computer controlled rotary energy means in order to automate adjustment of said throw programmably.

11. The invention of claim 1 wherein said boring head comprises an automatic means of adjusting the throw while said boring head is rotating.

12. The invention of claim 11 wherein said adjusting means is fitted with a numerically controlled or computer controlled rotary energy means in order to automate adjustment of said throw programmably.

* * * * *